(12) United States Patent
Oki et al.

(10) Patent No.: US 6,702,481 B2
(45) Date of Patent: Mar. 9, 2004

(54) METHOD AND APPARATUS FOR FUSION-SPLICING POLARIZATION MAINTAINING OPTICAL FIBERS

(75) Inventors: Eisuke Oki, Kanagawa (JP); Kensuke Ito, Kanagawa (JP); Shunichi Mizuno, Kanagawa (JP)

(73) Assignee: Sumitomo Electric Industrie, Ltd., Osaka (JP)

(*) Notice: Subject to any disclaimer, the term of this patent is extended or adjusted under 35 U.S.C. 154(b) by 112 days.

(21) Appl. No.: 10/115,424

(22) Filed: Apr. 4, 2002

(65) Prior Publication Data
US 2002/0159724 A1 Oct. 31, 2002

(30) Foreign Application Priority Data
Apr. 26, 2001 (JP) .................................... P. 2001-129569

(51) Int. Cl.[7] .............................................. G02B 6/255
(52) U.S. Cl. ............................ 385/96; 385/11; 385/97; 385/98
(58) Field of Search .................... 385/11, 43, 95–99, 385/147

(56) References Cited

U.S. PATENT DOCUMENTS 5,611,015 A * 3/1997 Tokumaru et al. ............. 385/98
6,467,973 B2 * 10/2002 Takahashi et al. ............. 385/96

FOREIGN PATENT DOCUMENTS

| JP | 2-196204 | 8/1990 |
| JP | 8-114720 | 5/1996 |

* cited by examiner

*Primary Examiner*—Phan T.H. Palmer
(74) *Attorney, Agent, or Firm*—McDermott, Will & Emery

(57) ABSTRACT

Each of optical fibers has a core and stress applying members disposed around the core. End portions of the optical fibers are mounted on a fusion-splicing apparatus, and aligned through the image observation from two different lateral directions of the optical fibers. Then, a distance between positions of a bright portion end and a luminance peak closest to the bright portion end is obtained on each bright portion end of a luminance distribution of the optical fiber obtained from at least one picked-up image. The optical fibers are fusion-spliced by aligning the stress applying members so that the sum of the distances is adjusted to be minimum. Alternatively, a distance between positions of the luminance peaks respectively closest to the respective bright portion ends is obtained and the optical fibers are fusion-spliced by aligning the stress applying members so that the distance is adjusted to be maximum.

19 Claims, 7 Drawing Sheets

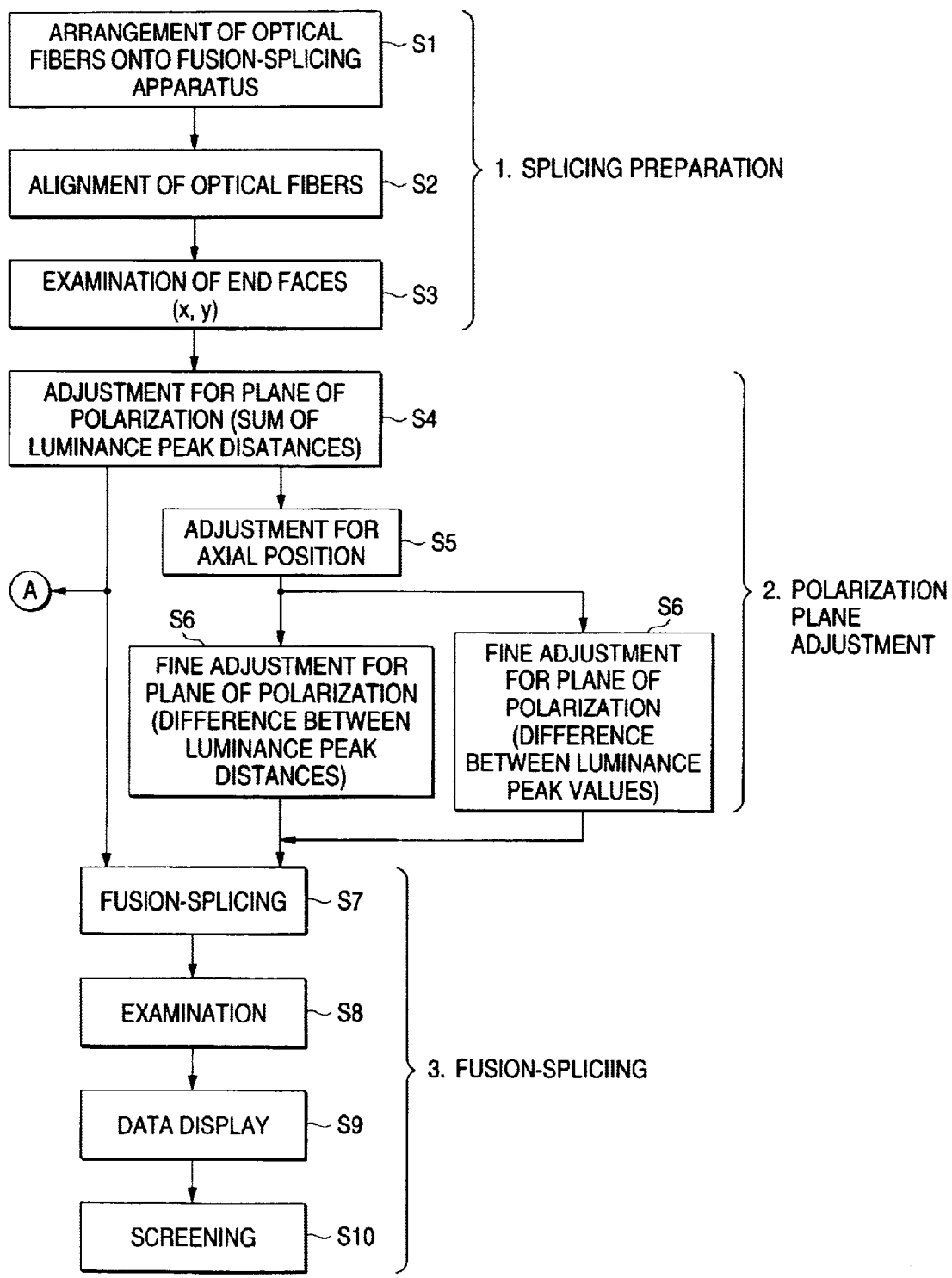

METHOD AND APPARATUS FOR FUSION-SPLICING POLARIZATION MAINTAINING OPTICAL FIBERS

BACKGROUND OF THE INVENTION

1. Field of the Invention

The present invention relates to a method and an apparatus for fusion-splicing polarization maintaining optical fibers by adjusting the polarization planes of the polarization maintaining optical fibers to be coincident with each other.

2. Description of the Related Art

A polarization maintaining optical fiber (PM-fiber) is given a birefringence property equivalently by introducing different stresses from two perpendicularly directions to a core. The typical polarization maintaining optical fibers include a PANDA fiber and a Bow-tie fiber in which stress applying members are disposed on both sides of the core. For fusion-splicing the polarization maintaining optical fibers, it is required that their polarization planes are coincided. The optical fibers maybe fusion-spliced with their polarization planes deviated at a predetermined angle, as needed. In this case, the polarization planes are once coincided, one of the optical fibers is rotated by the predetermined angle.

As a method for adjusting the polarization planes of the polarization maintaining optical fibers (hereinafter referred to as optical fibers) to be coincident with each other, an image observation method is well known of irradiating light to an optical fiber from a lateral side, and observing a transmitted optical image of the optical fiber, as disclosed in JP-A-2-196204.

FIGS. 9A–9D are views showing the method for adjusting the polarization planes to be coincident with each other through the image observation as disclosed in the above-mentioned patent. FIG. 9A is a view showing an observed state of optical fiber using an image pick-up camera. FIG. 9B is a view showing an observed optical image of optical fiber. FIG. 9C is a graph showing a luminance distribution of optical fiber. FIG. 9D is a graph showing a relation between a rotation angle of optical fiber and a difference between luminance peak distances. In FIGS. 9A–9D, reference numeral 1 denotes an optical fiber, 2 denotes a core, 3 denotes a stress applying member, 4 denotes an image pick-up camera, 5 denotes a display screen, 6 denotes an optical image of the optical fiber, 7 denotes a center of the optical fiber, 8a and 8b denote a luminance peak, and 9a and 9b denote an outer diameter position of optical fiber.

This method includes irradiating light from one lateral side of the optical fiber 1, picking up an optical image transmitted through the optical fiber on the other lateral side, using the image pick-up camera 4, and displaying the picked-up optical image as the optical fiber optical image 6 on the display screen 5. The luminance distribution of FIG. 9C is obtained from this optical fiber optical image 6, whereby the luminance peaks 8a and 8b are observed on both sides of the optical fiber center 7 owing to the refraction of lights transmitted through the stress applying members 3. Distances L and M between positions of the luminance peaks 8a, 8b and the optical fiber center 7 vary depending on the rotation positions of the stress applying members 3 for the optical fiber 1.

Accordingly, the rotation positions are adjusted so that the absolute value |L–M| of a difference between the luminance peak distances for each of the optical fibers 1 to be fusion-spliced may be close to zero, thereby adjusting the polarization planes to be coincident with each other to have a good fusion-splicing. In FIG. 9A, a rotation angle of the optical fiber is indicated at 90 degrees, when observed from a direction passing through the core 2 and the center of the stress applying members 3. The absolute value |L–M| at the rotation angle of 90 degrees become zero as shown in FIG. 9D. However, there are a plurality of rotation positions at which the absolute value |L–M| is equal to zero when the rotation angle is from 0 to 180 degrees with respect to an observation plane of the image pick-up camera 4 as shown in FIG. 9D. Further, the absolute value |L–M| is affected by the noise of the luminance distribution. Therefore, other parameters are needed to correctly acquire the predetermined rotation position (90 degrees).

As another image observation method, a technique is well known in which the positions of the luminance peaks of the optical fibers to be fusion-spliced are displayed on the display screen, and the optical fibers are adjusted so that luminance peak positions are coincident with each other (refer to JP-A-8-114720). This method is only required to align the luminance peak positions in the optical fibers to be fusion-spliced, but is not needed to have other parameters. However, this method is limited to the angles of the polarization plane at which the luminance peaks can be clearly recognized. Further, the luminance peak positions are displayed on the screen and aligned, requiring some labor and a hard task for the full automation.

SUMMARY OF THE INVENTION

The present invention has been achieved in the light of the above-mentioned problems. It is an object of the invention to provide a method and an apparatus for fusion-splicing polarization maintaining optical fibers in which a polarization plane of an optical fiber can be surely detected, and the method can be automated.

The present invention provides a method for fusion-splicing a first polarization maintaining optical fiber having a core and stress applying members which form a polarization plane and a second polarization maintaining optical fiber having a core and stress applying members which form a polarization plane, comprising: aligning an end face of the first polarization maintaining optical fiber and an end face of the second polarization maintaining optical fiber in accordance with images obtained from two different lateral directions of the first and second polarization maintaining optical fibers; adjusting the polarization planes of the first and second polarization maintaining optical fibers to be coincident with each other in accordance with a luminance distribution for each of the first and second polarization maintaining optical fibers, the luminance distribution being obtained from at least one of the images from two different lateral directions; and fusion-splicing the first and second polarization maintaining optical fibers with the thus coincided polarization planes with each other, wherein the polarization plane adjusting step includes detecting a first luminance peak closest to a first end of a bright portion of the luminance distribution and a second luminance peak closest to a second end of the bright portion, the second end being opposite to the first end, obtaining a sum of a first distance between positions of the first end and the first luminance peak and a second distance between positions of the second end and the second luminance peak, or a third distance between positions of the first and second luminance peaks, and moving at least one of the first and second polarization maintaining optical fibers such that the sum of the first and second distances becomes minimum or the third distance becomes maximum.

The present invention provides an apparatus for fusion-splicing a first polarization maintaining optical fiber having a core and stress applying members which form a polarization plane and a second polarization maintaining optical fiber having a core and stress applying members which form a polarization plane, comprising: two cameras for sensing the first and second polarization maintaining optical fibers from two different lateral directions; an image processing unit, connected to the two cameras, for obtaining a luminance distribution for each of the first and second polarization maintaining optical fibers from at least one of images from two different lateral directions sensed by the two cameras, detecting a first luminance peak closest to a first end of a bright portion of the luminance distribution and a second luminance peak closest to a second end of the bright portion, the second end being opposite to the first end, obtaining a sum of a first distance between positions of the first end and the first luminance peak and a second distance between positions of the second end and the second luminance peak, or a third distance between positions of the first and second luminance peaks; and an optical fiber holding mechanism for moving at least one of the first and second polarization maintaining optical fibers such that the sum of the first and second distances becomes minimum or the third distance becomes maximum to adjust the polarization planes of the first and second polarization maintaining optical fibers to be coincident with each other.

Here, the first end and second end of the bright portion of the luminance distribution are points where a luminance waveform of the bright portion and a background luminance threshold intersect.

BRIEF DESCRIPTION OF THE DRAWINGS

FIG. 2 is a flowchart for explaining a fusion-splicing method according to the present invention;

DETAILED DESCRIPTION OF THE INVENTION

Figure 1A:
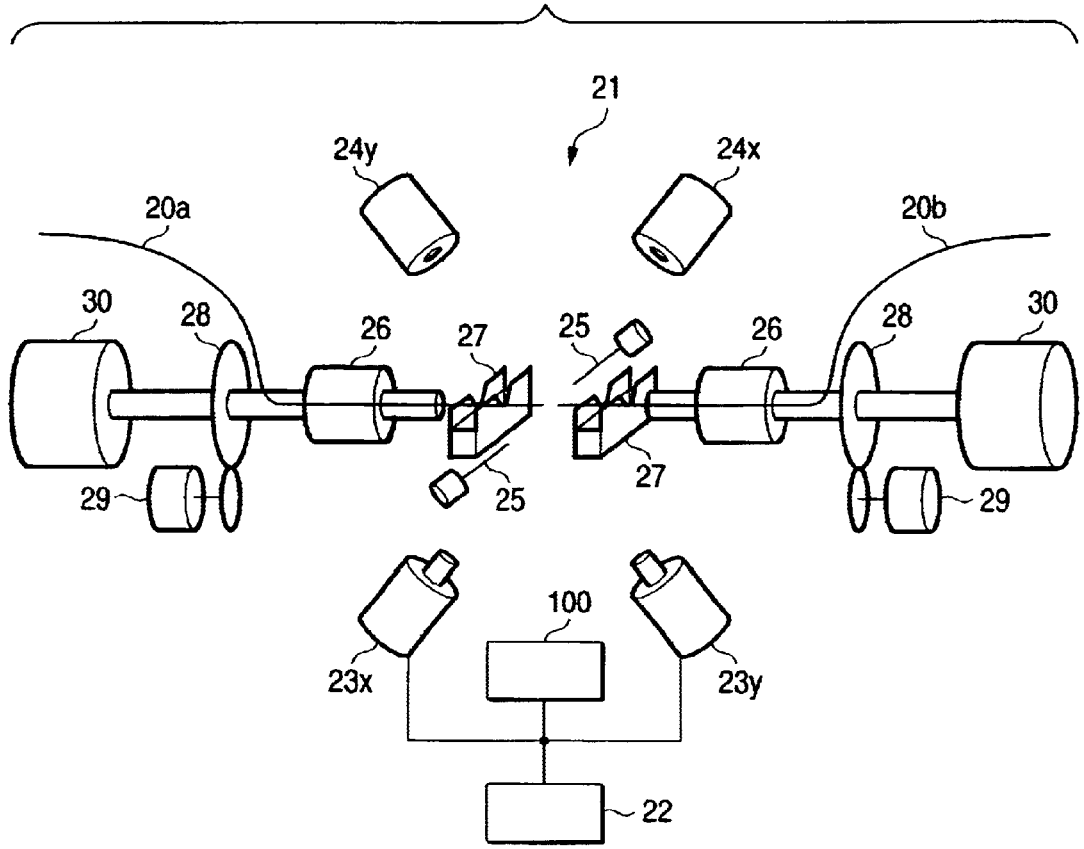
FIGS. 1A and 1B are views showing schematically a fusion-splicing apparatus according to the present invention.
Figure 1B:
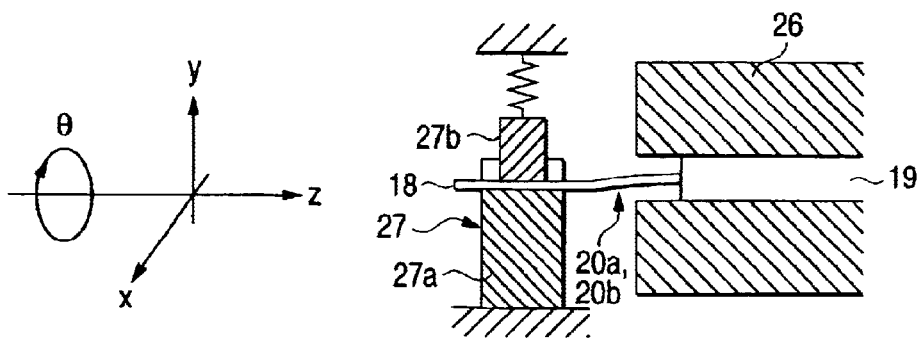

The preferred embodiments of the present invention will be described with reference to the accompanying drawings FIGS. 1A and 1B are views showing a fusion-splicing apparatus according to the present invention. FIG. 1A is a view showing schematically a fusion-splicing portion, and FIG. 1B is a view showing an optical fiber holding mechanism. In FIGS. 1A and 1B, reference numeral 18 denotes a glass optical fiber portion, 19 denotes a coated optical fiber portion, 20a and 20b denote an optical fiber, 21 denotes a fusion-splicing unit, 22 denotes a display unit, 23x and 23y denote an image pick-up camera, 24x and 24y denote an illuminating light source, 25 denotes a discharge electrode, 26 denotes a fiber chuck, 27 denotes a V-groove clamp, 27a denotes a V-groove board, 27b denotes a presser piece, 28 denotes a gear, 29 denotes a stepping motor, and 30 denotes an encoder.

The fusion-splicing apparatus comprises the fusion-splicing unit 21 for fusion-splicing the optical fibers 20a and 20b, the display unit 22, and a computer 100 having an image processing unit and a control unit. The fusion-splicing unit 21 comprises the image pick-up cameras 23x and 23y, and the illuminating light sources 24x and 24y. The image pick-up camera 23x observes a fusion part in the x direction. The image pick-up camera 23y observes the fusion part in the y direction almost perpendicular to the x direction. The illuminating light sources 24x and 24y such as LEDs are disposed to correspond to the image pick-up cameras 23x and 23y. In addition, a pair of discharge electrodes 25 for fusion-splicing are disposed across the fusion part of optical fibers.

Each of the optical fibers 20a and 20b is held by the optical fiber holding mechanism disposed corresponding to each fiber, and adjusted in the position, as shown in FIG. 1B. The optical fiber holding mechanism comprises the fiber chuck 26 for gripping the coated optical fiber portion 19 of the optical fiber 20a, 20b, and the V-groove clamp 27 for holding the glass optical fiber portion 18, and can be manually attached or detached. The fiber chuck 26 securely grips the coated optical fiber portion 19 of the optical fiber to rotate the optical fiber in a θ direction, and move the optical fiber in a z axis direction. The V-groove clamp 27 lightly holds the glass optical fiber 18 on the V-groove board 27a and with the presser piece 27b (a pressure force of 0.05N to 0.15N) to move the optical fiber in the x and y directions perpendicular to an axis of the optical fiber.

The rotation angle of the optical fiber 20a, 20b gripped by the fiber chuck 26 is detected by the encoder 30, and is rotated by a predetermined amount via the gear 28, when driven by the stepping motor 29, so that the polarization plane is adjusted. The fiber chuck 26 is moved independently of the V-groove clamp 27. Therefore, when the optical fiber is rotated, the glass optical fiber portion 18 is rotated slidingly under a clamp pressure of the V-groove clamp 27, and slid in the z axis direction. The V-groove clamp 27 is moved in the x or y direction (driving means not shown), independently of the fiber chuck 26.

One form of implementing a fusion-splicing method of the intention will be described below, employing the fusion-splicing apparatus. FIG. 2 is a flowchart for explaining the fusion-splicing method of the invention. For the explanation of this flowchart, reference is made to FIGS. 1A and 1B and the reference numerals. The detailed description of the parts is omitted. The method the invention includes the following three steps.

1. Splicing preparation process for physically aligning the optical fibers.

2. Polarization plane adjusting process for adjusting the polarization planes of optical fibers to be coincident with each other.

3. Fusion-splicing process for fusion-splicing the optical fibers.

The splicing preparation process includes S1 to S3 steps. S1 step involves gripping the coated optical fiber portion 19 of the optical fiber 20a, 20b having a fusion-spliced end face from which the coating is removed and which is treated, using the fiber chuck 26. In addition, a top end portion of the glass optical fiber portion 18 with the coating removed is put on the V-groove board 27a of the V-groove clamp 27, and positioned by the presser piece 27b. In addition, the fiber chuck 26 is driven in the z axis direction to adjust the distance from the discharge electrode, and the end face of the top end portion of the glass optical fiber portion 18 is cleaned by discharge.

S2 step involves adjusting focal points of the image pick-up cameras 23x and 23y, picking up images for the top end portions of the optical fibers 20a and 20b from x and y directions, and displaying the images on the display unit 22. The V-groove clamps 27 are driven in the x and y directions on the basis of the picked up data to physically align the optical fibers 20a and 20b. This alignment is made without regard to the polarization plane of optical fiber. The interval between end faces of the glass optical fiber portions 18 of the optical fibers 20a and 20b is adjusted to about 100 μm.

S3 step involves picking up the images for the end faces of the optical fibers 20a and 20b aligned at step S2, using the image pick-up cameras 23x and 23y, displaying the images on the display unit 22, and checking the shapes of the end faces and the attached dust to prepare for the next adjustment of the polarization plane. The steps are performed substantially in the same way as the ordinary alignment for fusion-splicing the optical fibers.

The next polarization plane adjusting process includes steps S4 to S6. The adjustment for the polarization plane is made by picking up the image of optical fibers, using at least one of the image pick-up cameras 23x and 23y used at the previous step, and acquiring a luminance distribution of each of optical fibers through the image processing from the picked up image, and making the arithmetical operation.

Figure 3A:
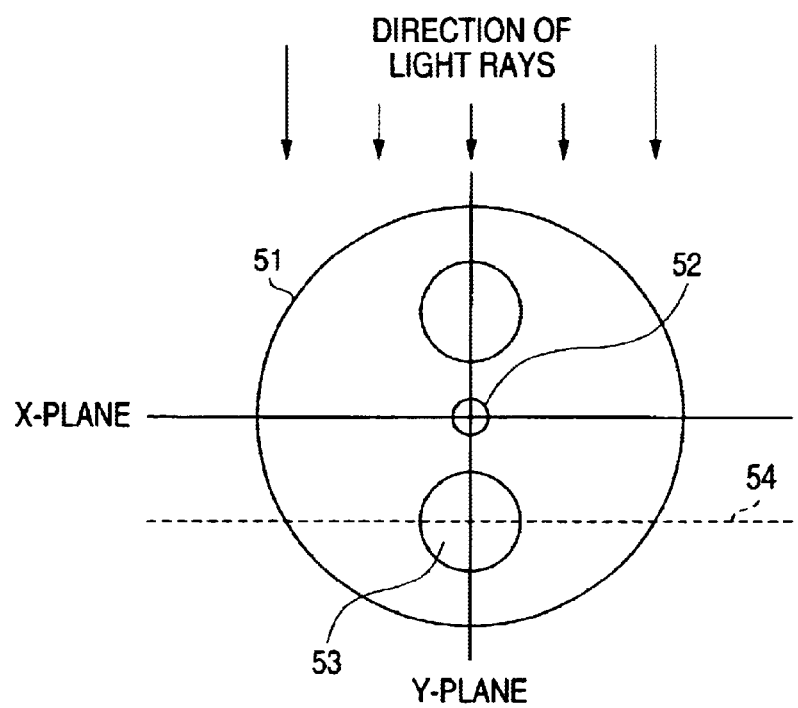
FIG. 3A is a simulation diagram showing, in cross section, an image pick-up situation of a PANDA fiber.

Referring to FIGS. 3A to 6, the adjustment of the polarization plane with the picked up image will be described below. FIG. 3A is a simulation diagram showing, in cross section, an image pick-up situation of a PANDA fiber. FIG. 3B is a graph representing a luminance distribution obtained from the picked up image of the PANDA fiber as shown in FIG. 3A. In FIGS. 3A and 3B, reference numeral 40 denotes a bright portion, 41 denotes a dark portion, 42, 43 denotes an outer diameter end of optical fiber, 44, 45 denotes a bright portion end, 46, 47, 48 denotes a luminance peak, 49 denotes a center of an optical fiber, 50 denotes a background luminance threshold, 51 denotes an optical fiber, 52 denotes a core, and 53 denotes a stress applying member. The bright portion 40 and the dark portion 41 are obtained because the optical fiber has a different refractive index from the air, and the interval between the bright portion and the dark portion is different depending in the focus position of an observation plane 54 when picking up the image. The background luminance threshold 50 is defined so that (distance between the bright portion ends 44 and 45)/(distance between the dark portion ends or fiber outer diameter ends 42 and 43) is preferably about 25%. The bright portion ends 44 and 45 are indicated as a point where a luminance waveform of the bright portion 41 and the background luminance threshold 50 intersect.

Figure 3B:
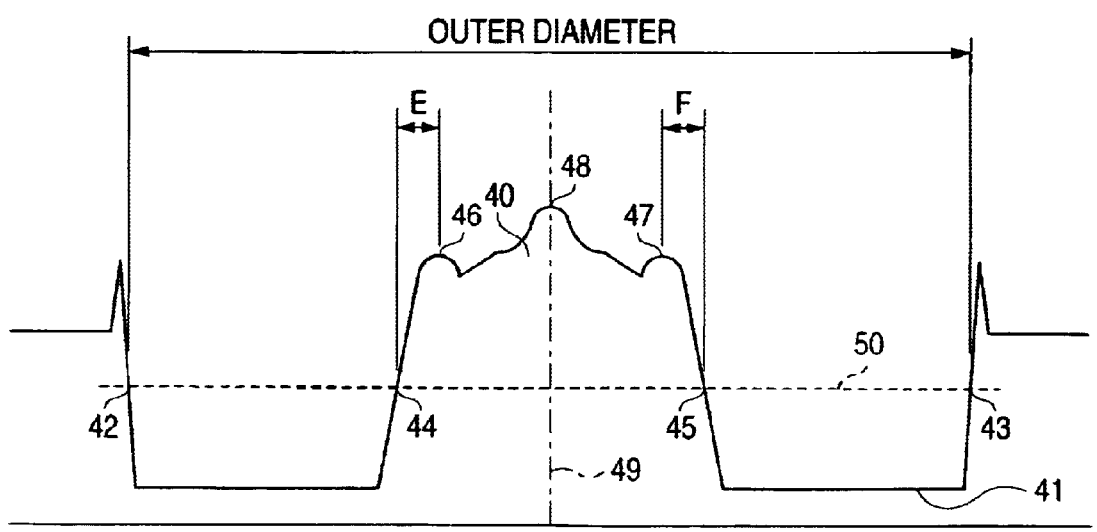
FIG. 3B is a graph representing a luminance distribution obtained from a picked up image of the PANDA fiber as shown in FIG. 3A.

In this embodiment, a plane (hereinafter referred to as a X-plane of optical fiber) perpendicular to a plane (hereinafter referred to as a Y-plane of optical fiber) passing through the core 52 of optical fiber and the center of the stress applying members 53 on both sides of the core is observed, as shown in FIG. 3A. In other words, the X-plane is parallel with the observation plane 54, and it is observed that the core 52 and the stress applying members 53 are arranged in tandem. The luminance distribution of FIG. 3B is indicated for the X-plane of optical fiber, in which the luminance peak 48 arises at the almost central position, and the luminance peaks 46 and 47 arise on its both sides due to influence of the stress applying members 53.

Figure 4A:
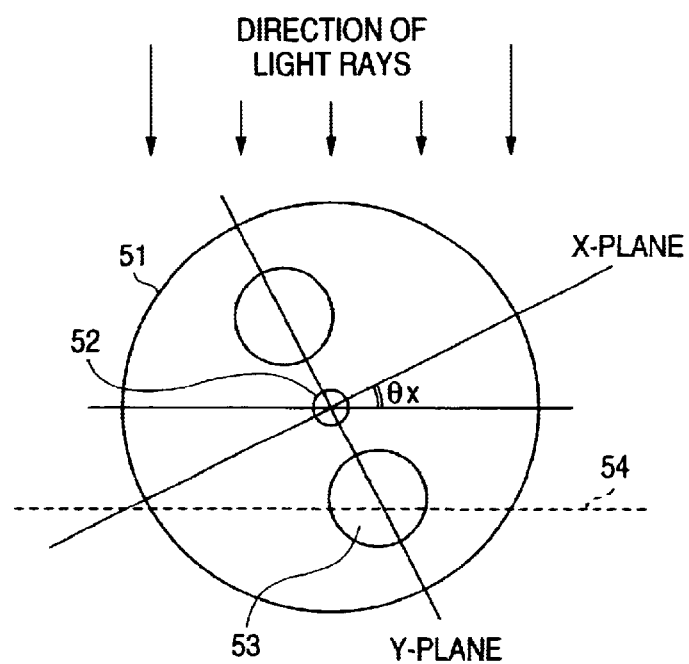
FIG. 4A is a simulation diagram showing, in cross section, an image pick-up situation of the PANDA fiber which is deviated by an angle θx from an observation plane.
Figure 4B:
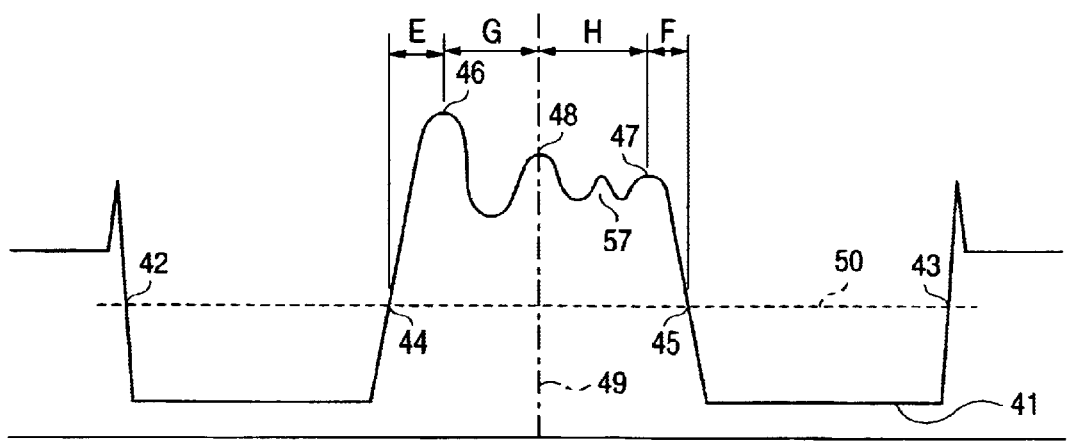
FIG. 4B is a graph representing a luminance distribution obtained from a picked up image of the PANDA fiber as shown in FIG. 4A.

FIG. 4A shows a state where the X-plane of optical fiber is deviated by angle θx from the observation plane, and FIG. 4B shows a luminance distribution at that time. If the X-plane has an angle relative to the observation plane 54, in the luminance distribution, the stress applying members 53 are left away from the fiber center. As a result, the positions and the peak values of the luminance peaks 46 and 47 on both ends may be varied, or any other peaks may arise.

In the first embodiment of the invention, the luminance peaks 46 and 47 closest to the bright portion ends 44 and 45 of the luminance distribution are employed to detect the polarization plane. To obtain the luminance peaks 46 and 47, there are provided the methods, including, for example, a method of acquiring the moving averages of the luminance values and smoothing them to determine the maximal value in the interval, and a method of detecting the peaks at the bright portion ends 44 and 45 by fitting of a higher-order function There is also a method of differentiating the luminance value from the bright portion ends 44 and 45 obtained at the points of intersection with the background luminance threshold 50 toward the fiber center 49, and acquiring the points at which the differentiated value is firstly zero. Herein, it is assumed that the distance between positions of the luminance peak 46 and the bright portion end 44 is E, and the distance between positions of the luminance peak 47 and the bright portion end 45 is F. If the X-plane is totally parallel to the observation plane 54, (E+F) indicates the minimum value, and (E−F) theoretically indicates zero.

Turning back to FIG. 2, S4 step for adjusting the polarization plane will be described below. In step S4, the sum (E+F) of distances between positions of luminance peaks and bright portion ends is detected to make the adjustment for the polarization plane, whereby the adjustments of the optical fibers 20a and 20b are made in parallel and at the same time. First of all, the optical fiber 20a, 20b is rotated at a predetermined rotation angle (e.g., in a unit of 15° to 20°) by the stepping motor 29. After rotating the optical fiber, the luminance value of the luminance distribution obtained at a rotation position with the predetermined rotation angle is differentiated to detect the luminance peaks 46 and 47. Further, it is checked whether or not any luminance peak (luminance peak 57 of FIG. 4B) at or above a predetermined height exists between the fiber center 49 and luminance peaks 46 and 47. If there is any other luminance peak except for the central luminance peak 48, the rotation of the optical fiber is continued, considering that the X-plane has a large angle relative to the observation plane 54.

If there are no luminance peaks except for the luminance peaks 46 and 47 and the central luminance peak 48, (E+F) is obtained as above cited. The measurements are continuously made. Then, of the rotation positions with rotation angle at which there are no luminance peaks except for the luminance peaks 46 and 47 and the central luminance peak 48, the rotation position at which (E+F) is at minimum is considered that at that rotation position, the X-plane of optical fiber is most parallel to the observation plane 54.

Then, the optical fibers 20a and 20b are adjusted to be positioned at the rotation position at which (E+F) is at minimum. It is noted that (E+F) of the rotation position at which (E+F) is at minimum may be divided by a bright portion end width (distance between the bright portion ends 44 and 45), and then a rotation position at which the quotient is at minimum is considered that at that rotation position, the X-plane of optical fiber is most parallel to the observation plane 54.

Figure 5:
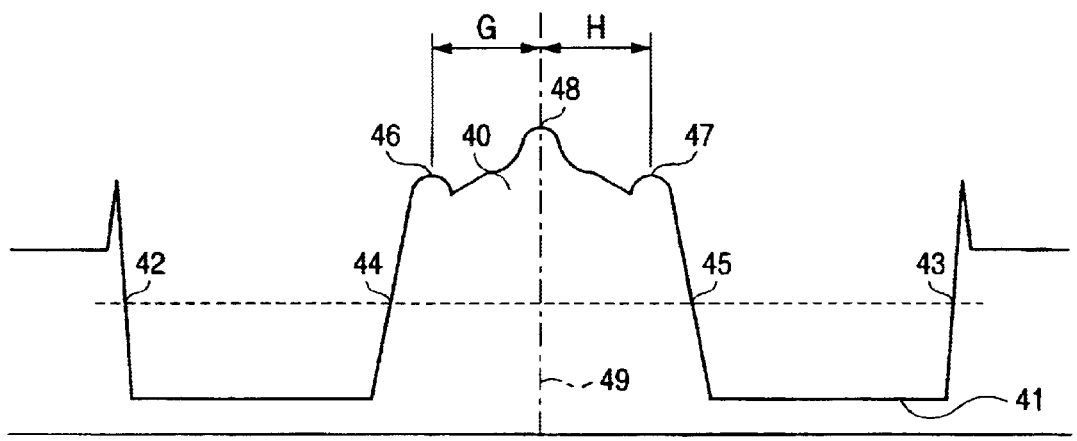
FIG. 5 is a graph representing a luminance distribution according to another embodiment of the invention.

FIG. 5 shows a second embodiment of the invention, in which the luminance peaks 46 and 47 of the luminance distribution are employed to detect the polarization plane, like the first embodiment. To obtain the luminance peaks 46 and 47, there are provided the methods, including, for example, a method of acquiring the moving averages of the luminance values and smoothing them to determine the maximal value in the interval, and a method of detecting the peaks at the bright portion ends 44 and 45 by fitting of a higher-order function. There is also a method of differentiating the luminance value from the bright portion ends 44 and 45 obtained at the points of intersection with the background luminance threshold 50 toward the fiber center 49, and acquiring the points at which the differentiated value is firstly zero. Herein, it is assumed that the distance between positions of the luminance peak 46 and the fiber center 49 is G, and the distance between positions of the luminance peak 47 and the fiber center 49 is H. If the X-plane is totally parallel to the observation plane 54, (G+H) indicates the maximum value, and (G−H) theoretically indicates zero.

Herein, the fiber center 49 is obtained from the outer diameter of optical fiber. Since this fiber center 49 is considered to be almost coincident with the center between the bright portion ends 44 and 45 from FIG. 3B, the fiber center 49 is replaced with the bright portion center to calculate G and H. If the core 52 is eccentric, the central position of the core may be obtained, and the fiber center 49 maybe replaced with the center of core to calculate G and H.

In the same manner as described in the first embodiment of FIGS. 3A and 3B, the sum (G+H) of distances between positions of the fiber center 49 and the luminance peaks 46 and 47 is detected at S4 step to adjust the polarization plane. The adjustments of the optical fibers 20a and 20b are made in parallel and at the same time. First of all, the optical fiber 20a, 20b is rotated at a predetermined rotation angle (e.g., in a unit of 15° to 20°) by the stepping motor 29. After rotating the optical fiber, the luminance value of the luminance distribution at a rotation position with the predetermined rotation angle is differentiated to detect the luminance peaks 46 and 47. Further, it is checked whether or not any luminance peak (luminance peak 57 of FIG. 4) at or above a predetermined height between the luminance peaks 46 and 47 and the fiber center 49. If there is any other luminance peak except for the central luminance peak 48, the rotation of the optical fiber is continued, considering that the X-plane has a large angle relative to the observation plane 54. It is noted that, instead of obtaining the sum (G+H) of distances, (G+H) may be divided by a bright portion end width (distance between the bright portion ends 44 and 45) to obtain the quotient.

If there are no luminance peaks except for the luminance peaks 46 and 47 and the central luminance peak 48, (G+H) is obtained as above cited. The measurements are continuously made. Then, of the rotation positions with rotation angle at which there are no luminance peaks except for the luminance peaks 46 and 47 and the central luminance peak 48, a rotation position at which (G+H) is at maximum is considered that at that rotation position, the X-plane of optical fiber is most parallel to the observation plane 54.

Figure 9A:
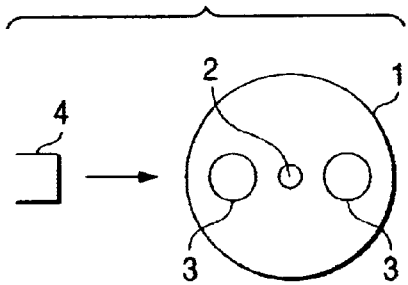
FIGS. 9A–9D are views for explaining the prior art.
Figure 9B:
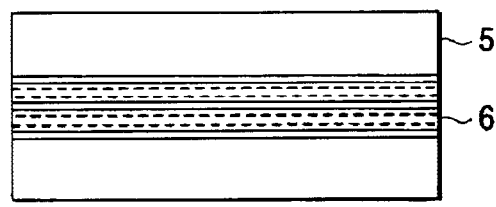
Figure 9C:
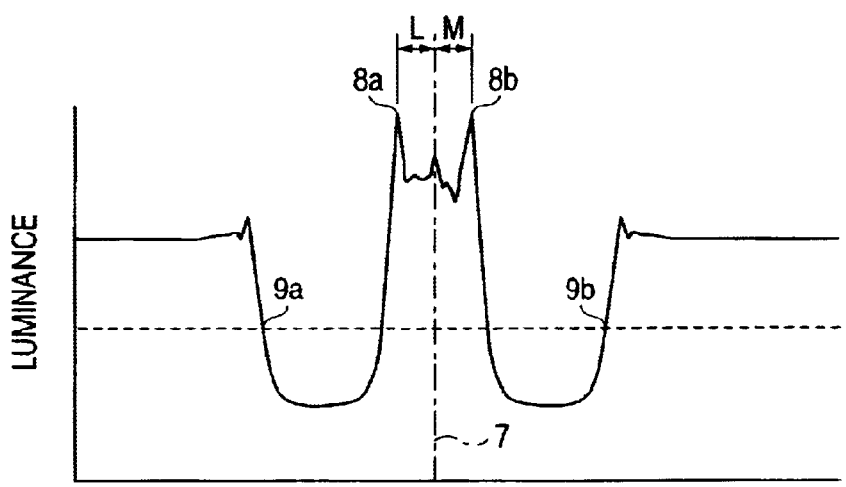
Figure 9D:
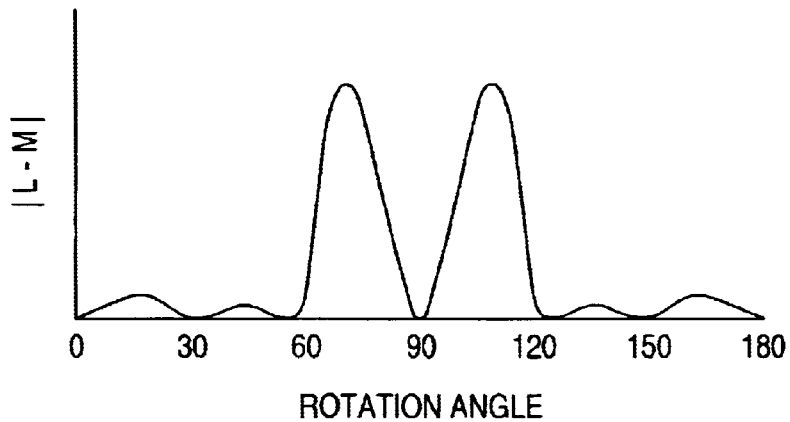

As mentioned the above, the polarization plane can be roughly obtained depending on whether the sum (E+F) of luminance peak distances is at minimum, the sum (G+H) of luminance peak distances is at maximum, the quotient of (E+F) divided by the bright portion end width is at minimum, or the quotient of (G+H) divided by the bright portion end width is at maximum. In detecting the Y-plane for the polarization plane thereby obtained, a rotation position at 90 degrees can be securely detected, without detection of a plurality of zero points shown in FIG. 9D as described in the prior art. In the above description, the rough adjustment is made in a unit from 15° to 20°, but the adjustment may be made at a smaller angle to detect the position for the polarization plane precisely. If the high precision is not needed, the adjustment for the polarization plane may be ended at S4 step, and the operation may proceed to the next fusion-splicing steps (S7 to S10).

At S5 step, a holding state for the optical fiber adjusted at S4 step is adjusted again. If the optical fibers 20a and 20b are rotated at relatively large angles of rotation at S4 step, they are not necessarily rotated smoothly, because the glass optical fiber 18 is subjected to a clamp pressure between the V-groove board 27a and the presser piece 27b, as seen in the holding state for the optical fiber in FIG. 1B. Therefore, there is the possibility that a rotational residual stress may occur between the fiber chuck 26 and the V-groove clamp 27.

Thus, at S5 step, preparing for the fine adjustment at the next S6 step, the residual stress is once released. This is effectively made by adjusting the interval between the end faces of optical fibers to about 20 μm by moving optical fibers 20a and 20b in the z axis direction. The residual stress may be also released by removing the pressure of the presser piece 27b, which is made manually or automatically using pressure removal means.

At the next S6 step, the fine adjustment for the polarization plane is made, including a primary fine adjustment and a secondary fine adjustment. The fine adjustment of the optical fibers 20a and 20b are performed in parallel and at the same time as well. The adjustment at S4 step employs the sum (E+F) or (G+H) of luminance peak distances, but this fine adjustment step employs a difference (E−F) or (G−H) between the luminance peak distances as above mentioned. Employing (E−F) or (G−H), the direction for adjusting the rotation is automatically detected based on whether the sign is plus or minus, whereby the amount of adjustment can be detected in the absolute value. The adjustment of rotation is made by deciding the rotation driving direction and the amount of adjusting the rotation by multiplying a rotation driving factor K (deg/μm) for converting the distance into the rotation angle.

The primary fine adjustment is made by rotating the optical fiber in a predetermined direction on the basis of the sign of numerical value. The rotation is stopped at the time when the numerical value indicates zero, or crosses zero. When the numerical value crosses zero, the optical fiber is rotated in a reverse direction (based on the sign), and repeatedly rotated, as needed, whereby the rotation position at which the absolute value of (E−F) or (G−H) is closest to zero is obtained. The rotation driving factor K may be changed in accordance with the repetitive number of times.

Thereafter, the secondary fine adjustment is made by rotating the optical fiber minutely. The rotation angle depends on the operative resolution of the stepping motor 29, but may be adjusted so that the absolute value of (E−F) or (G−H) is closest to zero by rotating the optical fiber in a unit from 0.1° to 0.2°, for example, and calculating the difference (E–F) or (G–H) between luminance peak distances in the same manner as in the primary fine adjustment.

Figure 6:
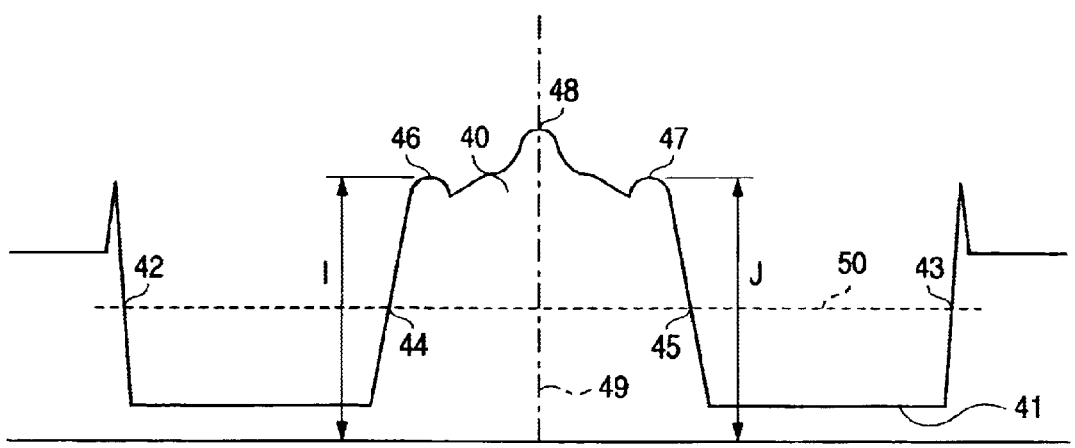
FIG. 6 is a graph representing a luminance distribution according to still another embodiment of the invention.

FIG. 6 is a graph showing another embodiment for making the fine adjustment for the polarization plane, in which the luminance peaks 46 and 47 closest to the bright portion ends 44 and 45 of the luminance distribution are employed. To obtain the luminance peaks 46 and 47, in the same manner as described in the first embodiment and shown in FIGS. 3A and 3B, there are provided the methods, including, for example, a method of acquiring the moving averages of the luminance values and smoothing them to determine the maximal value in the interval, and a method of detecting the peaks at the bright portion ends 44 and 45 by fitting of a higher-order function. There is also a method of differentiating the luminance value from the bright portion ends 44 and 45 obtained at the points of intersection with the background luminance threshold 50 toward the fiber center 49, and acquiring the points at which the differentiated value is firstly zero. Assuming that a luminance peak value (height) of luminance peak 46 is I, and a luminance peak value (height) of luminance peak 47 is J, a luminance peak value difference (I–J) is calculated. If the X-plane is totally parallel to the observation plane 54, (I–J) theoretically indicates zero.

Since the luminance peak values I and J can be measured with reference to the zero luminance of luminance waveform, there is less influence due to noise in the measurement, compared with the difference (E–F) or (G–H) of the luminance peak distances, whereby the measurement error can be reduced. For example, an extinction ratio value obtained by the image observation based on the difference (E–F) or (G–H) of the luminance peak distances is 29 dB, and an extinction ratio value obtained by the image observation based on the difference (I–J) of the luminance peak values is 35 dB.

Employing the luminance peak value difference (I–J), the fine adjustment for the polarization plane is made at S6 step, including a primary fine adjustment and a secondary fine adjustment in the same manner as when using the luminance peak distance difference (E–F) or (G–H). The adjustment of the optical fibers 20a and 20b are performed in parallel and at the same time as well. The primary fine adjustment involves detecting automatically the direction for adjusting the rotation based on whether the sign of the difference (I–J) is plus or minus and detecting the amount of adjustment in the absolute value. The adjustment of rotation is made by deciding the rotation driving direction and the amount of adjusting the rotation by multiplying a rotation driving factor K (deg/μm) for converting the distance into the rotation angle.

The optical fiber is rotated in a predetermined direction on the basis of the sign of numerical value, and the rotation is stopped at the time when the numerical value indicates zero, or crosses zero. When the numerical value crosses zero, the optical fiber is rotated in a reverse direction (based on the sign), and repeatedly rotated, as needed, whereby the rotation position at which the value of (I–J) is closest to zero is obtained. The rotation driving factor K may be changed in accordance with the repetitive number of times.

Thereafter, the secondary fine adjustment is made by rotating the optical fiber minutely. The rotation angle depends on the operative resolution of the stepping motor 29, but may be adjusted so that the absolute value of (I–J) is closest to zero by rotating the optical fiber in a unit from 0.1° to 0.2°, for example, and calculating the difference (I–J) between luminance peak values.

The fine adjustment for the plane of polarization with the difference (E–F) or (G–H) between luminance peak distances at S6 step or the difference (I–J) between luminance peak values is divided into the primary fine adjustment and the secondary fine adjustment in the manner as above described. However, the fine adjustment may be only made using either the primary fine adjustment or the secondary fine adjustment. For example, the primary fine adjustment may be only employed and the secondary fine adjustment omitted, or the primary fine adjustment may be omitted and the secondary fine adjustment only employed from the first by rotating minutely the optical fiber and taking a lot of time.

After the adjustment of the polarization plane based on the image observation as shown in FIGS. 3A to 6, if there is an optical displacement in the polarization planes of the optical fibers, the optical fibers are aligned by the optical power monitor to correct for the optical displacement, whereby the polarization planes of the optical fibers can be adjusted at high precision.

Figure 7:
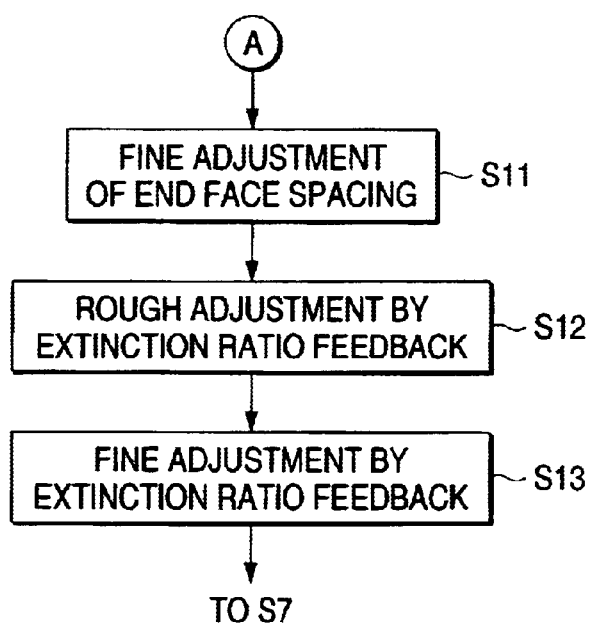
FIG. 7 is a flowchart for explaining an adjustment of the optical fibers by an optical power monitor according to the present invention.

More specifically, the adjustment of the polarization plane by the optical power monitor includes steps S11 to S13, as shown in FIG. 7. The adjustment of the polarization plane by this optical power monitor involves correcting for the optical displacement from the geometrical position of the polarization plane by the stress applying members to align the optical fibers at high precision. In the embodiment of the invention, the optical power monitor is an extinction ratio monitor for automatically measuring an X polarized wave and a Y polarized wave.

Figure 8:
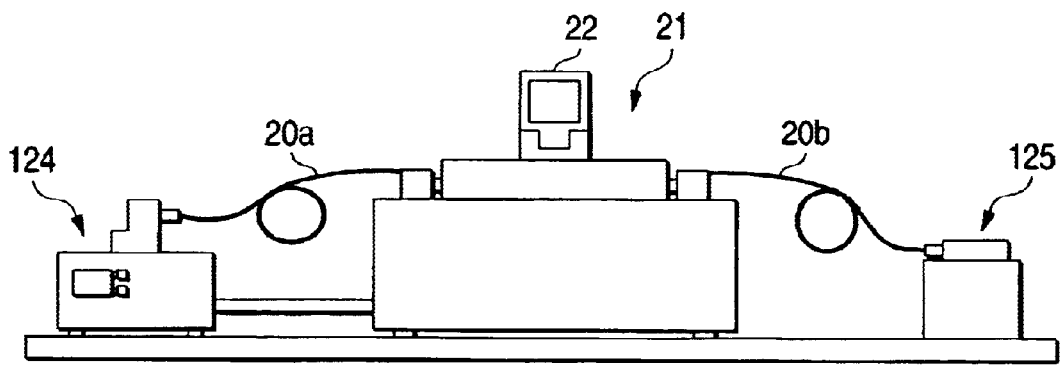
FIG. 8 is a view showing schematically a fusion-splicing apparatus with the optical power monitor according to the present invention.

The extinction ratio monitor is attached to the fusion-splicing apparatus (FIG. 1A) and includes an extinction ratio measurement monitor 124 and a monitor light source 125 as shown in FIG. 8. A free end of one optical fiber 20a is connected to the extinction ratio measurement monitor 124 and a free end of the other optical fiber 20b is connected to the monitor light source 125. In this embodiments in addition to the extinction ratio monitor, the image pick-up cameras 23x and 23y are used to observe the core of the optical fibers 20a and 20b in the x and y direction and make the alignment of the core of the optical fibers.

S11 step involves adjusting an end face spacing between the optical fibers, in which the end face spacing between the optical fibers 20a and 20b is minimized to reduce an optical power loss. In the adjustment before this step, the optical fibers 20a and 20b are adjusted independently by the image observation, whereby the end face spacing is not too much problem. Rather, the end face spacing is kept relatively large to avoid the end faces abutting during the alignment because the optical fibers are rotated greatly. In the optical power monitor, the rotation angle is not great, because the detection of the polarization plane is already made quite precisely by the image observation, whereby the end face position of the optical fiber is not varied greatly. The end face spacing is adjusted in a range from 5 μm to 40 μm, depending on the ability of the monitor light source and the extinction ratio measured value of the optical power monitor.

S12 step involves making the rough adjustment by the extinction ratio monitor, in which either one of the optical fibers 20a and 20b is rotated by every predetermined angle (e.g., every 2 degrees) in either direction by the stepping monitor 29. Since the position of the core maybe shifted by the rotation, the V-groove board 27 is driven in the x or y direction to make the alignment for the core. The decision of the core by the image observation can be made by the same method as used for the typical single mode optical fiber. The extinction ratio value is detected every time the rotation angle position is changed. If the extinction ratio value is smaller than at the previous rotation angle position, the rotation driving direction is reversed, or if the extinction ratio value is greater than at the previous rotation angle position, the rotation driving is continued to detect the rotated position of optical fibers at which the extinction ratio value is maximum.

S13 step involves making the fine adjustment by the extinction ratio monitor, in which either one of the optical fibers 20a and 20b is rotated minutely (e.g., every 0.125° depending on the resolving power of the stepping motor) in either direction by the stepping motor 29. Every time of rotation, the V-groove board 27 is driven in the x or y direction to make the alignment for the core in the same manner as at S12. The extinction ratio value is detected every time the rotation angle position is changed in the same manner as at S12. If the extinction ratio value is smaller than at the previous rotation angle position, the rotation driving direction is reversed, or if the extinction ratio value is greater than at the previous rotation angle position, the rotation driving is continued to detect the rotated position of optical fiber at which the extinction ratio value is maximum. If the end face spacing between the optical fibers is varied, a step of maintaining the end face spacing constant may be added. An extinction ratio obtained by the optical power monitor after the image observation is, for example, 38 dB.

In the above way, the optical fibers 20a and 20b are aligned, with the polarization planes coincided, and the operation transfers to the next fusion-splicing process. The fusion-splicing process consists of S7 to S10 steps. The fusion-splicing process is performed in the same manner as with the fusion-splicing method ordinarily employed.

At S7 step, the interval between the end faces of the optical fibers 20a and 20b is adjusted to the interval suitable for the fusion-splicing, and the optical fibers 20a and 20b are fusion-spliced through a pair of discharge electrodes 25. The fusion-splicing of the polarization maintaining optical fibers requires that the discharge power is weak and the discharge time is slightly longer, because the stress applying members are more likely to deform than when employing the single mode fiber. In the case where the alignment of optical fibers is not made at the early time (till S3 step) or the axis of optical fiber is deviated in the process (S4 to S6 steps) for adjusting the polarization planes to be coincident with each other, a step for aligning the core diameters or outer diameters of optical fibers may be added to the beginning at S7 step.

At S8 step, a fusion state of fusion-splicing is examined, and a splicing state is observed, employing the image pick-up cameras 23x and 23y. The contents of examination include examining the external appearance of thick or slender splicing portion, the mixed dust or air bubbles, the inclination of the core and the misalignment.

At S9 step, the estimated loss value and the estimated extinction ratio value are displayed and recorded. The estimated loss value and the estimated extinction ratio value are displayed regarding the values statistically estimated from the past data, on the basis of the information obtained through the observation of image.

If the optical power monitor is used for correcting for the optical displacement, the extinction ratio value measured by the optical power monitor is displayed.

At S10 step, the screening is performed by applying a certain tension to the optical fibers that are fusion-spliced. Succeeding in the screening, the process is ended. Thereafter, the optical fibers that are fusion-spliced are removed from the apparatus, but the rotation angle or its direction for taking the optical fiber through an outlet of the fiber chuck 26 is usually different depending on the left or right-sided optical fiber. The angles of rotation are measured by the encoders 30 connected to the fiber chucks 26. Accordingly, to prevent a bending stress from being applied on the fusion-splicing portion that is not reinforced, the optical fibers 20a and 20b are rotated synchronously, on the basis of the angle data from the encoders 30, and then the optical fiber closer to the outlet is taken out. Thereafter, the other fiber chuck is rotated singly, and then the other optical fiber is taken out. After the optical fibers are taken out, the fusion-splicing portion is reinforced by the well known methods.

The S1 to S13 steps have been described above, but the fine adjustment (S6 step) by the image observation may be omitted by having some load on the optical power monitor. The rough adjustment (S12 step) by the optical power monitor may be omitted if it is apparent that there is only a minute optical displacement in the polarization plane. Furthermore, if there is no optical displacement in the polarization plane of the optical fiber at all, it is needless to say that the adjustment (S11 to S13 steps) of the polarization plane by the optical power monitor is not required.

In the above embodiments, the polarization planes of the optical fibers 20a and 20b are coincided, but the optical fibers 20a and 20b may be fusion-spliced by deviating the polarization planes of the optical fibers 20a and 20b at a predetermined angle. In this case, the optical fibers 20a and 20b may be fusion-spliced by firstly adjusting the polarization planes of the optical fibers 20a and 20b to be coincident with each other and rotating any one of the optical fibers by a predetermined angle.

Further, in the above embodiments, the adjustments of the optical fibers 20a and 20b are made in parallel and at the same time, but the optical fibers may be adjusted independently.

As described above, with the present invention, the luminance peak change in the luminance distribution of image for the polarization maintaining optical fiber is detected, and the sum of distances between positions of the luminance peaks which are respectively closest to the bright portion ends and the bright portion ends is obtained. Alternatively, the sum of distances between positions of the luminance peaks which are respectively closest to the bright portion ends and the fiber center is obtained. Therefore, the polarization plane is securely detected. Also, in the fine adjustment for detecting the polarization plane, the polarization plane can be detected at high precision in a short time by obtaining the difference of distances between positions of the luminance peaks which are respectively closest to the bright portion ends and the bright portion ends, or the difference of distances between positions of the luminance peaks which are respectively closest to the bright portion ends and the fiber center, or the difference between the luminance peak values. Further, in the image processing for the polarization maintaining optical fiber, the luminance peaks are detected, and arithmetically operated, whereby the full automation is enabled, and the aligning precision is increased without relying on the skills. Since the parameter for securely detecting the predetermined rotation position is adjusted as an index in the adjustment range from 0° to 180°, the adjusting procedure is not confused and the adjusting time can be shortened.

Further, the polarization planes of the optical fibers are adjusted to be coincident with each other beforehand by detecting the geometrical arrangement of the stress applying members using the image observation, and an optical displacement in the polarization planes is corrected by the optical power monitor, whereby the optical fibers can be fusion-spliced in such a condition that the polarization planes of the optical fibers coincide at very high precision. Since the polarization planes are adjusted to be coincident with each other by the image observation that is relatively easily adjusted, the adjustment by the optical power monitor taking a lot of time can be effected in a short time. The misalignment of core axis by the optical power monitor is always detected by the image observation to align the optical fibers, whereby the precision of the optical power monitor itself can be increased.

What is claimed is:

1. An apparatus for fusion-splicing a first polarization maintaining optical fiber having a core and stress applying members which form a polarization plane and a second polarization maintaining optical fiber having a core and stress applying members which form a polarization plane, comprising:

two cameras for sensing the first and second polarization maintaining optical fibers from two different lateral directions;

an image processing unit, connected to the two cameras, for obtaining a luminance distribution for each of the first and second polarization maintaining optical fibers from at least one of images from two different lateral directions sensed by the two cameras, detecting a first luminance peak closest to a first end of a bright portion of the luminance distribution and a second luminance peak closest to a second end of the bright portion, the second end being opposite to the first end, obtaining a sum of a first distance between positions of the first end and the first luminance peak and a second distance between positions of the second end and the second luminance peak, or a third distance between positions of the first and second luminance peaks; and an optical fiber holding mechanism for moving at least one of the first and second polarization maintaining optical fibers such that the sum of the first and second distances becomes minimum or the third distance becomes maximum to adjust the polarization planes of the first and second polarization maintaining optical fibers to be coincident with each other.

2. The apparatus according to claim 1, further comprising:

an optical power monitor for correcting an optical displacement of the polarization planes of the first and second polarization maintaining optical fibers.

3. The apparatus according to claim 2, wherein the optical power monitor is an extinction ratio monitor which detects an extinction ratio value of the first and second polarization maintaining optical fibers, and the holding mechanism moves at least one of the first and second polarization maintaining optical fibers so that the extinction ratio value is maximum.

4. The apparatus according to claim 1, wherein the image processing unit detects a difference between the first and second distances, and the holding mechanism moves at least one of the first and second polarization maintaining optical fibers so that the difference between the first and second distances becomes minimum to finely adjust the polarization planes of the polarization maintaining optical fibers.

5. The apparatus according to claim 1, wherein the image processing unit detects a difference between a first luminance value of the first luminance peak and a second luminance value of the second luminance peak, and the holding mechanism moves at least one of the first and second polarization maintaining optical fibers so that the difference between the first and second luminance values becomes minimum to finely adjust the polarization planes of the polarization maintaining optical fibers.

6. The apparatus according to claim 1, further comprising:

a pair of discharge electrodes for fusion-splicing end faces of the first and second polarization maintaining optical fibers with the coincided polarization planes with each other.

7. The apparatus according to claim 1, wherein the holding mechanism moves the first and second polarization maintaining optical fibers in parallel and at the same time.

8. A method for fusion-splicing a first polarization maintaining optical fiber having a core and stress applying members which form a polarization plane and a second polarization maintaining optical fiber having a core and stress applying members which form a polarization plane, comprising:

aligning an end face of the first polarization maintaining optical fiber and an end face of the second polarization maintaining optical fiber in accordance with images obtained from two different lateral directions of the first and second polarization maintaining optical fibers;

adjusting the polarization planes of the first and second polarization maintaining optical fibers to be coincident with each other in accordance with a luminance distribution for each of the first and second polarization maintaining optical fibers, the luminance distribution being obtained from at least one of the images from two different lateral directions; and fusion-splicing the first and second polarization maintaining optical fibers with the thus coincided polarization planes with each other, wherein the polarization plane adjusting step includes detecting a first luminance peak closest to a first end of a bright portion of the luminance distribution and a second luminance peak closest to a second end of the bright portion, the second end being opposite to the first end, obtaining a sum of a first distance between positions of the first end and the first luminance peak and a second distance between positions of the second end and the second luminance peak, or a third distance between positions of the first and second luminance peaks, and moving at least one of the first and second polarization maintaining optical fibers such that the sum of the first and second distances becomes minimum or the third distance becomes maximum.

9. The method according to claim 8, further comprising:

correcting an optical displacement of the polarization planes of the first and second polarization maintaining optical fibers by an optical power monitor, prior to the fusion-splicing step.

10. The method according to claim 9, wherein the optical power monitor is an extinction ratio monitor, and the correcting step includes detecting an extinction ratio value of the first and second polarization maintaining optical fibers, and moving at least one of the first and second polarization maintaining optical fibers so that the extinction ratio value is maximum.

11. The method according to claim 10, wherein the moving step includes rotating at least one of the first and second polarization maintaining optical fibers by each predetermined angle, and the correcting step includes aligning the first and second polarization maintaining optical fibers in accordance with the images from two different lateral directions at every rotation position.

12. The method according to claim 9, wherein the correcting step includes rotating at least one of the first and second polarization maintaining optical fibers by each predetermined angle, and wherein a rotation direction of the first and second polarization maintaining optical fibers is reversed when the extinction ratio value is smaller than at the previous rotation position in adjusting the rotation position of the first and second polarization maintaining optical fibers.

13. The method according to claim 8, further comprising:

finely adjusting the polarization planes of the first and second polarization maintaining optical fibers to be coincident with each other, prior to said fusion-splicing step, wherein the finely adjusting step includes obtaining a difference between the first and second distances, and moving at least one of the first and second polarization maintaining optical fibers so that the difference between the first and second distances becomes minimum.

14. The method according to claim 13, wherein the moving step includes rotating at least one of the first and second polarization maintaining optical fibers in accordance with an adjustment angle calculated by multiplying the difference between the first and second distances by a rotation drive factor.

15. The method according to claim 13, further comprising:

adjusting axial positions of the first and second polarization maintaining optical fibers, prior to the finely adjusting step.

16. The method according to claim 8, further comprising:

finely adjusting the polarization planes of the first and second polarization maintaining optical fibers to be coincident with each other, prior to said fusion-splicing step, wherein the finely adjusting step includes obtaining a difference between a first luminance value of the first luminance peak and a second luminance value of the second luminance peak, and moving at least one of the first and second polarization maintaining optical fibers so that the difference between the first and second luminance values becomes minimum.

17. The method according to claim 16, wherein the moving step includes rotating at least one of the first and second polarization maintaining optical fibers in accordance with an adjustment angle calculated by multiplying the difference between the first and second distances by a rotation drive factor.

18. The method according to claim 16, further comprising:

adjusting axial positions of the first and second polarization maintaining optical fibers, prior to the finely adjusting step.

19. The method according to claim 8, wherein the first and second polarization maintaining optical fibers are moved in parallel and at the same time.

* * * * *